(12) United States Patent
Sgro et al.

(10) Patent No.: US 8,930,772 B2
(45) Date of Patent: Jan. 6, 2015

(54) METHOD AND SYSTEM FOR IMPLEMENTING A TEST AUTOMATION RESULTS IMPORTER

(75) Inventors: Thomas J. Sgro, Rock Tavern, NY (US); Fred R. Galloway, Peekskill, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 547 days.

(21) Appl. No.: 13/251,704

(22) Filed: Oct. 3, 2011

(65) Prior Publication Data

US 2013/0086420 A1 Apr. 4, 2013

(51) Int. Cl.
G06F 11/00 (2006.01)
G06F 11/36 (2006.01)

(52) U.S. Cl.
CPC .................................. *G06F 11/3692* (2013.01)
USPC .................................. 714/45; 714/46; 714/57

(58) Field of Classification Search
CPC . G06F 11/3688; G06F 11/3684; G06F 17/21; G06F 17/2247; G06F 17/243
See application file for complete search history.

(56) References Cited

U.S. PATENT DOCUMENTS

| | | | |
|---|---|---|---|
| 2004/0133880 A1* | 7/2004 | Paternostro et al. | 717/124 |
| 2004/0205565 A1* | 10/2004 | Gupta | 715/513 |
| 2008/0215921 A1* | 9/2008 | Branca et al. | 714/38 |
| 2009/0271661 A1* | 10/2009 | Miyai et al. | 714/35 |
| 2010/0070231 A1* | 3/2010 | Hanumant | 702/123 |
| 2012/0297367 A1* | 11/2012 | Mujeeb et al. | 717/125 |

* cited by examiner

*Primary Examiner* — Scott Baderman
*Assistant Examiner* — Jason Bryan

(57) ABSTRACT

A test automation results importer allows for the results of automated test cases to be imported into a test management platform thereby providing the integration of otherwise incompatible automation platforms with test management platforms. This system utilizes the automation platform for the creation of a generic automation results file containing a data format that allows the results to be easily understood by the test management platform. The automated test results may be stored in a pre-defined area of the test management system on the management system platform. This process virtually integrates a third party automation platform with another third party test management platform to create a virtual single platform to conduct testing from automated test case creation to automated test case results documentation.

17 Claims, 10 Drawing Sheets

METHOD AND SYSTEM FOR IMPLEMENTING A TEST AUTOMATION RESULTS IMPORTER

BACKGROUND INFORMATION

Existing automation platforms provide testing technologies for certain networks and applications. However, the ability to fully automate the entire testing process from test initiation to test results management has its shortcomings. For instance, automation platforms are not readily integrated with test management platforms. Thus, the ability to fully automate the testing process is severely limited because test results from the automation application would need to be manually entered into the test management system. As a result, the time and effort associated with the testing process is increased and this further jeopardizes any cost savings or other benefits of using an automation platform.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

A test automation results importer (TARI) automates the testing process from automated test case initiation to documentation of automated test case results. The TARI process allows for the results of automated test cases to be imported into a test management platform thereby providing the integration of otherwise incompatible automation platforms with test management platforms. This system utilizes the automation platform for the creation of a generic automation results file (ARF) containing a data format that allows the results to be easily understood by the test management platform. The TARI application obtains the results contained in the ARF and transports them from the automation platform into the test management platform via an interface, such as an automation results interface (ARI). The automated test results may be stored in a pre-defined area of the test management system. This process virtually integrates a third party automation platform with another third party test management platform to create a virtual single platform to conduct testing from automated test case creation to automated test case results documentation.

The creation of a single virtual automation platform that automates the entire testing process increases the time savings and cost savings associated with automated testing. As a result, testing staff is able to reduce test cycle durations thereby allowing for improved time-to-market service deployments. This process may combine an automation scripting language and a test management system. Therefore, test results from heterogeneous test automation systems may be normalized through a virtualizer (TARI) and read homogeneously to a third party test management system.

Figure 1:
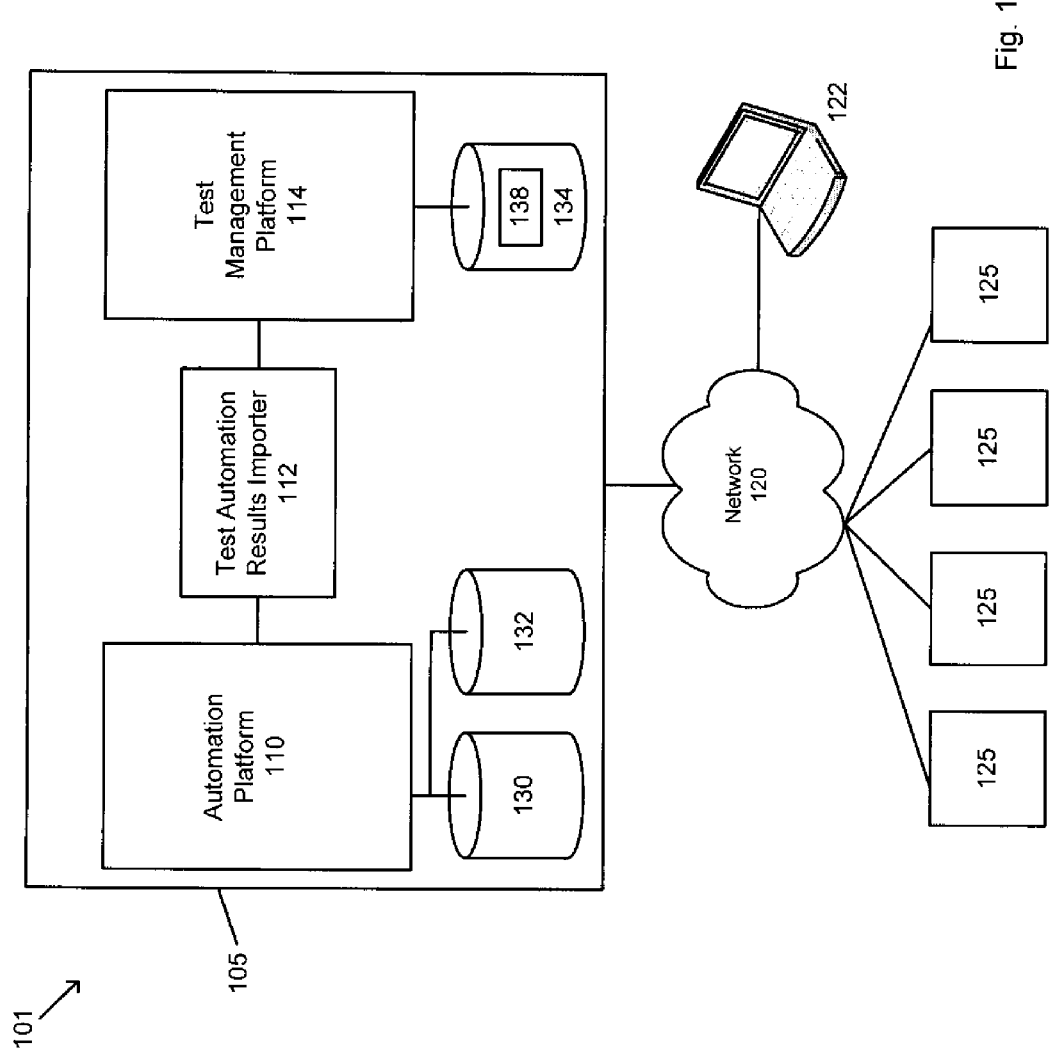
FIG. 1 illustrates an exemplary test environment for testing networks and/or network devices according to a particular embodiment.

FIG. 1 illustrates an exemplary test environment 101 for testing networks 120 and/or network devices 125 according to a particular embodiment. Test environment 101 includes test application 105, which in turn includes an Automation Platform 110, a Test Automation Results Importer 112 and Test Management Platform 114. Test application 105 generally includes computer-executable program instructions implemented on one or more computing devices. In particular, it is to be understood that Automation Platform 110, Test Automation Results Importer 112 and Test Management Platform 114 may be located on a single computing device, may each be located on a different computing device, or that each of Automation Platform 110, Test Automation Results Importer 112 or Test Management Platform 114 may be implemented on more than one computing device. For example, Automation Platform 110 may be installed on one or more client computers 122, while Test Automation Results Importer 112 and/or Test Management Platform 114 may be installed on a central server (not illustrated in FIG. 1), and may simply provide a graphical user interface (GUI) in the form of a web page or the like that may be viewed in a display of a client computer 122.

The test cases may be designed to measure and/or test network parameters such as are generally known. Accordingly, it is possible to measure parameters of a wide variety of different types of communication networks, and a network 120 may include, but is not limited to, one or more of the following kinds of networks: wireless networks, cellular telephone networks, broadcast media networks, cable networks, satellite networks, television networks, Internet protocol based ("IP-based") networks, Voice over Internet Protocol (VoIP) networks, Public Switched Telephone Networks (PSTNs), the Internet, private networks, Local Area Networks (LANs), Wide Area Networks (WANs), pico-networks, and other networks.

Network devices 125 may include but are not limited to, telephony switches, network infrastructure devices, traffic generating devices, network element management devices and other third party test equipment.

By integrating Automation Platform 110 with Test Management Platform 114 via Test Automation Results Importer 112, environment 101 has both broad functionality and full test automation. For example, the Test Management Platform 114 provides user tools for creating and documenting test cases which may be used to create automated test scripts in Automation Platform 110. The test scripts may be stored in Automation Platform Repository 130. When launched, the Automation Platform 110 may run automated command lines, e.g., automated test scripts, associated with the test cases to test one or more network devices 125 and capture data resulting from the tests scripts being run. Accordingly, fully automated test scripts may be controlled by Automation Platform 110. Test scripts may be executed, and data captured and reported, automatically via Test Automation Results Importer 112. The results may be written to a file, such as an Automated Results File, which may be stored in Automated Results File (ARF) Repository 132. Automation Platform 110 may launch Test Automation Results Importer 112 which imports the results file and sends the results file to an identified storage location associated with Test Management Platform 114. The Test Management Platform 114 may be configured to store the results, e.g., test results 138 in Test Management Platform (TMP) Repository 134.

Test Automation Results Importer 112 provides a method for automating the entire testing process from test initiation to test results documentation in an environment where Automation Platform 110 is separate from Test Management Platform 114. As a result, a single virtual automation platform may be utilized. Test Automation Results Importer 112 provides a virtual interface between a third party test automation system, such as Automation Platform 110, that utilizes a unique scripting language and a third party test management system, such as Test Management Platform 114, used for storing test results 138 in TMP Repository 134. This may be accomplished through the combination of the automation scripting language and a test management system API. For example, Test Automation Results Importer 112 may be realized by a master script that may be used to execute and document the results of any test case regardless of type without the need to re-create existing test cases. As a result, an embodiment of the present invention combines the Automation Platform 110 and the Test Automation Results Importer 112 in a unique way that provides the ability to normalize the results of a third party automation testing application and present those results homogeneously to another third party test management system, such as Test Management Platform 114. Thus, testing software and test management software that may be otherwise incompatible may be integrated via a test automation results importer to avoid manual input of test results from the testing software into the test management software.

Test Management Platform 114 may store test results 138 in one or more data stores, as shown by representative TMP Repository 134. Test results 138 may include data received by Test Management Platform 114, via Automation Platform 110, concerning a test or tests conducted as provided for in a test case. Examples of such data include responses of devices 125 to particular commands, information concerning whether a device 125 was able to respond to a particular command, information concerning the amount of time taken for a device 125 to respond to a particular command, etc. Because data from Automation Platform 110 is processed into a generic format, the formatted data may be automatically stored in and readily accessible from TMP Repository 134 associated with Test Management Platform 114.

Storage of test results 138 from Automation Platform 110 allows for mapping and reporting of data from tests conducted by Automation Platform 110 automatically and without human intervention. Accordingly, TMP Repository 134 may be automatically populated with data from Automation Platform 110. Therefore, it is possible to provide output, e.g., description and expected results data, from the Automation Platform 110 that is mapped to fields in TMP Repository 134 associated with Test Management Platform 114. For example, status data (e.g., pass or fail) related to a device 125 may map to pass/fail fields in TMP Repository 134 for a particular test case. Accordingly, it is not necessary to manually transfer data from Automation Platform 110 to Test Management Platform 114. A feature of an embodiment of the present invention allows the results of hundreds and thousands of test scripts from an Automation Platform to be automatically imported to a TMP Repository in a matter of minutes, without the need to manual enter each test result from each test case.

Computing devices such as those used for test application 105, including Automation Platform 110, Test Automation Results Importer 112 and Test Management Platform 114, generally include instructions executable by the computing device and stored on a computer-readable medium included within or connected to the computing device. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Repositories or data stores may be included within or otherwise associated with test application 105, such as Repositories 130, 132 and 134 which may include relational database software such as is generally known. Relational database software generally refers to a relational database management system (RDBMS), as is known. An RDBMS generally employs the known Structured Query Language (SQL). However, it is to be understood that data stores included within test application 105 may be some other kind of database such as a hierarchical database, a set of files, an application database in a proprietary format, etc. Further, it is to be understood that Repositories 130, 132 and 134 discussed herein may represent separate repositories or data stores for purposes of convenience and clarity, but that Repositories 130, 132 and 134 may also represent separate repositories or data stores all included in a single database or in one or more separate databases. Moreover, Repositories 130 and 132 may be separate from and/or associated with Automation Platform 110. Likewise, Repository 134 may be separate from and/or associated with Test Management Platform 114.

Figure 2:
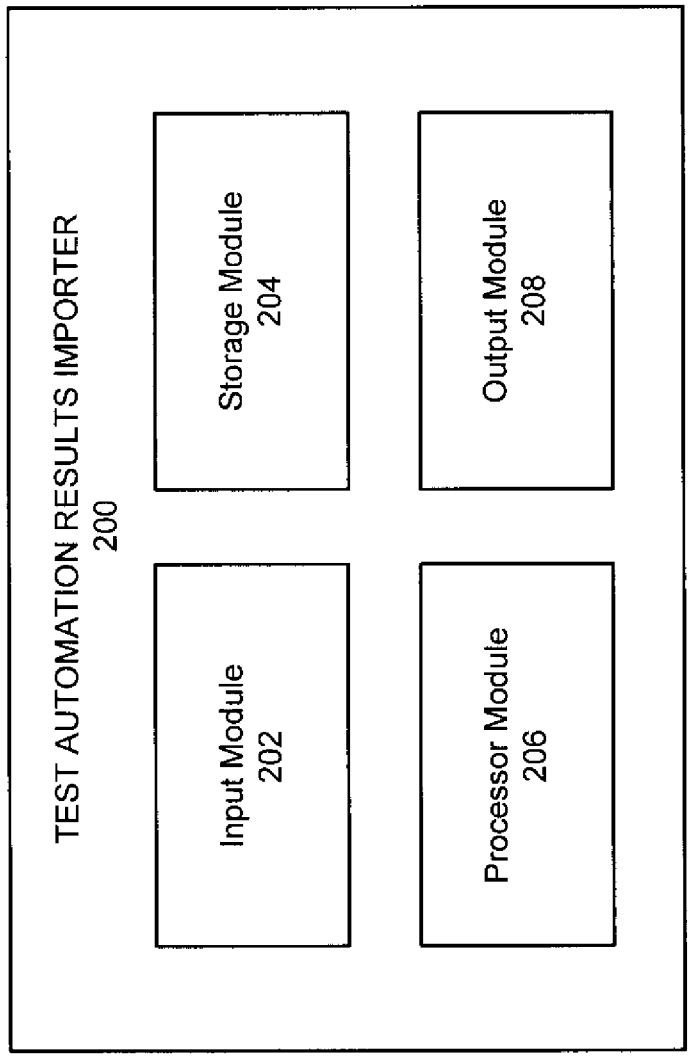
FIG. 2 illustrates an exemplary diagram of a test automation results importer according to a particular embodiment.

FIG. 2 illustrates a test automation results importer according to a particular embodiment. In an exemplary embodiment, test automation results importer 200 may include an input module 202, a storage module 204, a processor module 206 and an output module 208. It is noted that modules 202, 204, 206 and 208 are exemplary. The functions of modules 202, 204, 206 and 208 may be performed at other modules remote or local to test automation results importer 200, and modules 202, 204, 206 and 208 may be combined or separated. Other modules may be provided as necessary and/or desired.

Test automation results importer 200 may receive input from an Automation Platform 110 at input module 202. The input may be in the form of an ARF or other file format. Input module 202 may include computer-implemented software, hardware, or a combination of both, configured to receive information from an Automation Platform 110. The storage module 204 may include computer-implemented software, hardware, or a combination of both, configured to store the input and/or other data. Processor module 206 may include computer-implemented software, hardware, or a combination of both, configured to process the input data and/or identify a storage location for the input data. Output module 208 may include computer-implemented software, hardware, or a combination of both, configured to transmit the processed data for storage at the storage location of Test Management Platform 114 or other identified location.

As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

Figure 3:
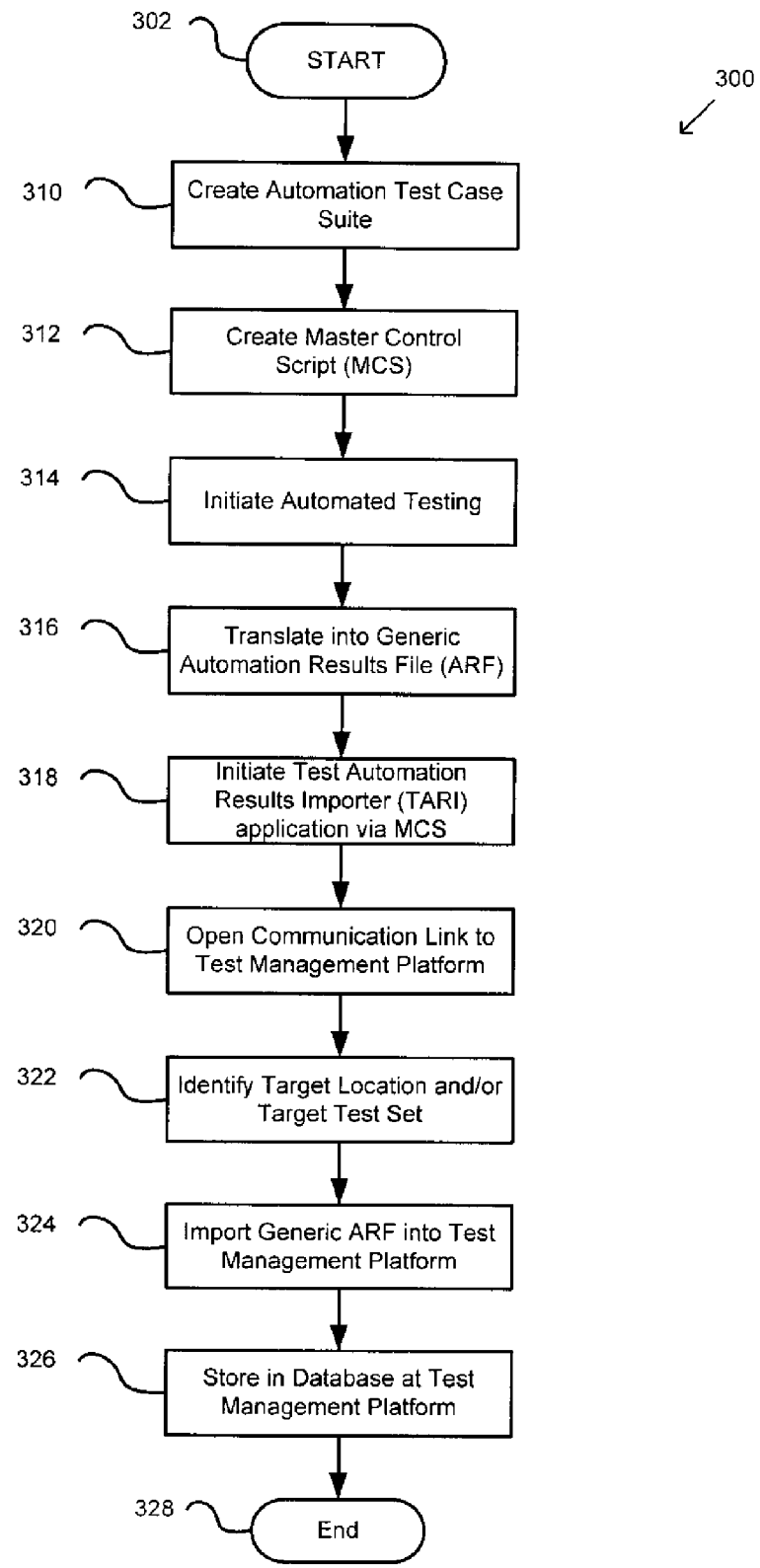
FIG. 3 illustrates an exemplary process for implementing a test automation results importer according to a particular embodiment.

FIG. 3 illustrates an exemplary process 300 for implementing a test automation results importer according to a particular embodiment. The process flow for this virtual system may start at step 302. In step 310, using a third party automation platform, a user may create or identify individual test case scripts with individual test key parameters. Test key parameters may include an identifier that is associated with an individual test script. Based on this test key parameter, a particular test case may be identified. In addition, the test key parameter may also be associated with test set identification parameters, which may include a location identifier, such as a domain and project combination. A domain may include multiple projects and within each project, a collection of test cases may be grouped together. Other types of identification or keys may also be implemented.

The user may combine a plurality of automated test scripts into one or more automation test suites. For example, a test suite may relate to a testing of a system, device (e.g., type of computer, etc.) and the test cases within the test suite may refer to each individual test associated with the system or device. For example, a test case may involve testing a device to determine if a function operates properly. The test case may be identified by a test key parameter (e.g., 001, 002, etc.). A corresponding test script may be created to automate that test case. The corresponding test script may be identified by the same test key parameter (e.g., 001, 002, etc.). After the test script is run and the results are written to a file, the TARI application may identify a corresponding target location at the test management platform for receiving the results of the test script for that particular test case, based on the test key parameter.

Next, in step 312, the user may create a Master Control Script (MCS) in the automation platform to initialize the one or more automation test suites. The MCS may identify the scripts for testing. For example, the user may identify or select one or more individual scripts to be included in testing. Also, a user may identify individual scripts for testing exclusion. In this example, a user may identify or list scripts that will be skipped during execution. A user may also identify the location of scripts for testing by identifying a path to a directory, for example. Other methods for identifying test scripts may be realized.

Next, in step 314, automated running of each script identified by the MCS may be initiated. The MCS may call each script in the automation test suites.

Next, in step 316, the MCS may create an automation results file (ARF) and translate the results of the automated testing into a generic format. As each script is run, the results may be captured, formatted and recorded to a file, such as the ARF. For example, the results may indicate whether certain functions passed or failed. Other indicators may be used as well. A specific format for the file, or ARF, may be customized. As an example, the ARF format may include the following fields: testscript identifier|passed or failed indicator|name of testing software|date|time|comment. The testscript identifier may include a test key parameter that may be also used to identify the corresponding test case. Additional fields, such as tester, comment, etc., may be used. The ARF format may vary depending on application, level of detail desired and other customizable preferences.

Figure 4:
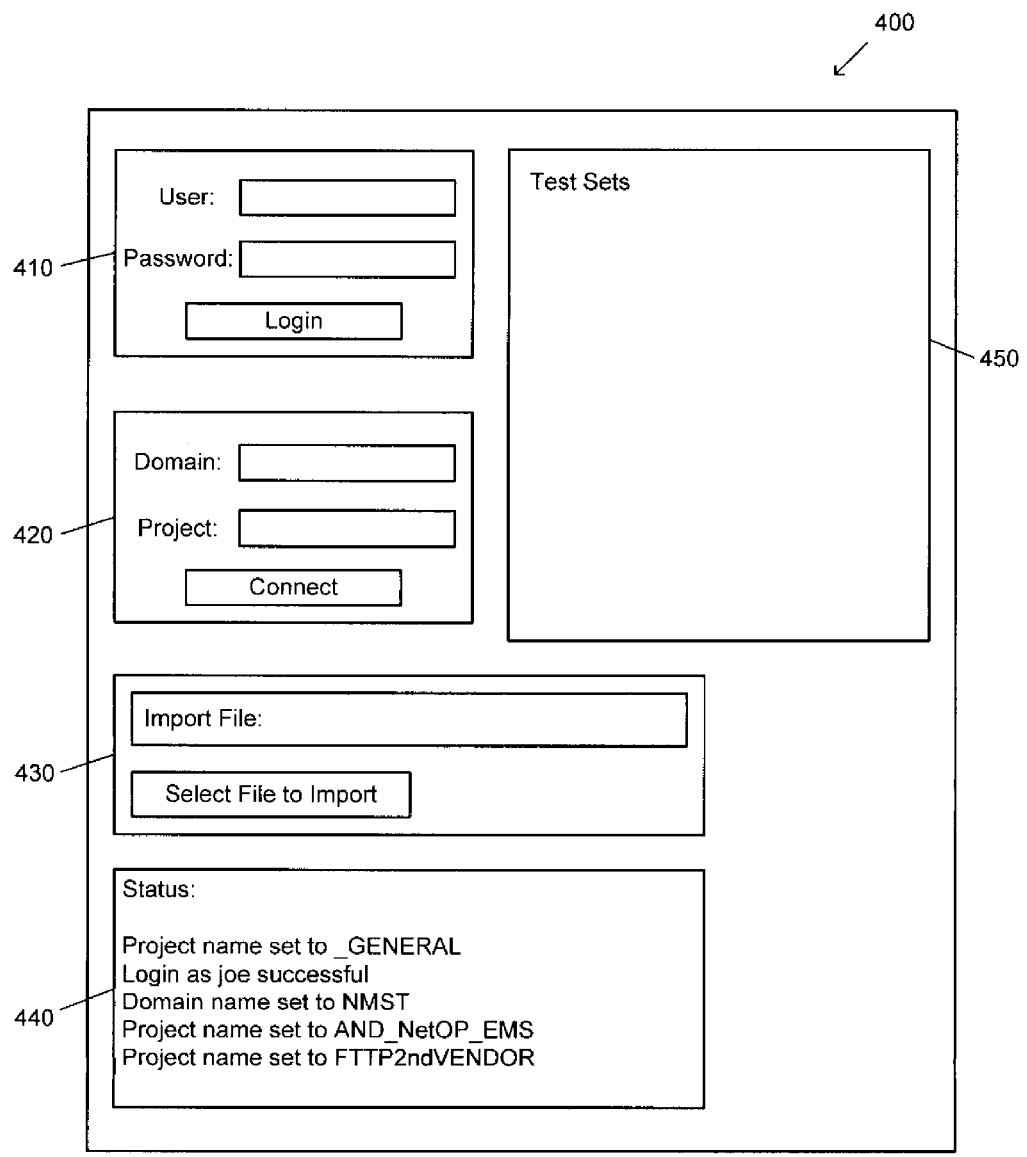
FIG. 4 illustrates an exemplary graphical user interface according to a particular embodiment.

Next, in step 318, the MCS may then initiate the TARI script application. The TARI script application may be accessed via a graphical user interface, as shown by FIG. 4.

Next, in step 320, the TARI may open an Automation Results Interface (ARI) on test management platform. The Automation Results Interface provides a connection between the Test Automation Results Importer 112 and the Test Management Platform 114. This step may involve entering user and password information and logging onto the platform, as shown by 410.

Next, in step 322, the TARI may identify a target location on the test management platform. This step may be realized by identifying a domain and/or project, as shown by 420. For example, the domain may include multiple projects and within each project, a grouping of test cases may exist. The identification of the domain and/or project may be generated automatically or a user may manually enter this information.

By selecting a domain and project combination, the available folders within the domain and project combination may be displayed in Test Sets 450. Test sets may be graphically or otherwise illustrated at 450. For example, test sets may be displayed as a hierarchy of folders or other graphical depiction. This may include parent nodes, children nodes, grandchildren nodes and other subsequent nodes. This graphic may assist the user in managing the test cases. For example, a folder called "Automation" may be displayed and selected. In this folder, multiple test sets may be available. Each test set may correspond to a particular test script by a test key parameter. By matching the test key parameter, the TARI application may identify the corresponding test set and write the results of the corresponding test script from the ARF. Other methods for identifying a target location may also be implemented.

Next, in step 324, the TARI may read or otherwise process the results of the ARF into appropriate fields (e.g., via test key parameter) of the test management system. This step may be realized by identifying a file to import, as shown by 430. The identification of a file to import may be generated automatically or a user may manually enter this information. When reading the import file, the test management platform knows what fields to expect based on the test format. Thus, according to an exemplary application, the import file may be expected to have the following fields: testscript identifier|passed or failed indicator|name of testing software|date|time|comment. If certain fields are not received as expected, an appropriate error message may be displayed in the status box 440. For example, error messages may indicate that all expected fields are not received. In this case, this test case may be skipped. According to another example, if a field provides an unexpected result value, an error message may indicate that the result is not an expected value and set the result to "inconclusive."

Next, in step 326, the test management system may accept the input, e.g., ARF, from TART and store the results in the identified target location. For example, as discussed above, the target location may be identified by a domain and project combination. The target location may include a particular file, folder, database or other storage medium or location. As shown in FIG. 4 at status box 440, input and acceptance of ARF data into test management database is shown. Status information may also be displayed, such as time for test import, number of imports, average time per records and/or other useful status information. Other status information may include which test sets have been imported, which test sets have not been imported, which test sets have errors, etc.

Following step 326, process 300 ends.

Figure 5:
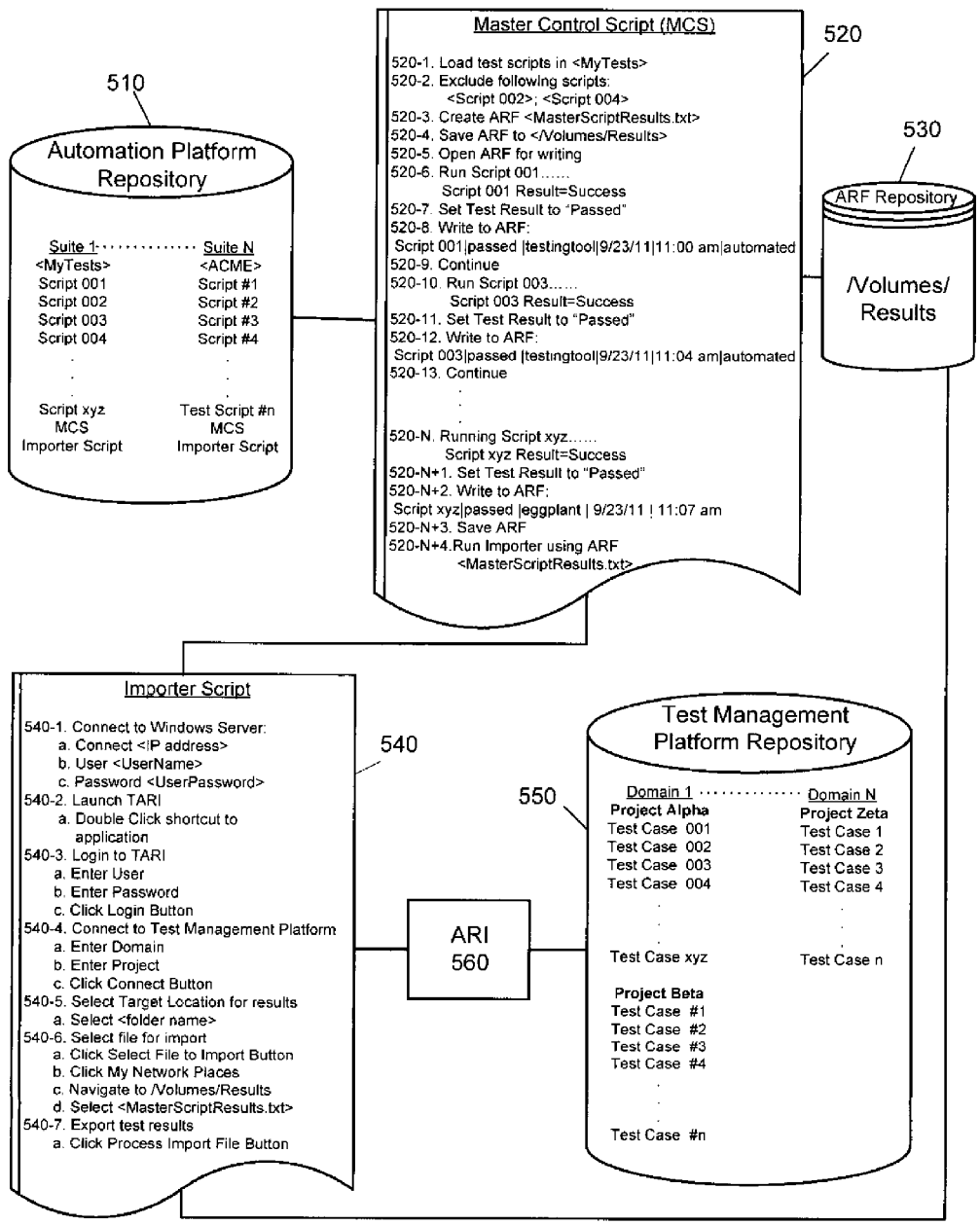
FIG. 5 illustrates exemplary interactions between the automation platform and test management platform according to a particular embodiment.

FIG. 5 illustrates exemplary interactions between the automation platform and test management platform according to a particular embodiment. Automation Platform Repository 510 may be associated with an automation platform. The Automation Platform Repository 510 may include various suites, where each suite may include multiple scripts. Each script may be identified by a test key parameter. For example, a suite may be associated with testing of a particular device and each script within that suite may be related to testing functions associated with the particular device. A user may want to test a laptop and certain functionality related that laptop. The suite may refer to the laptop and the test scripts may each be related to functionality associated with the laptop. For example, a test script may test whether pushing button A results in action X on the laptop.

As shown by 510, multiple suites, in this case <MyTests> and <ACME> test suites, may be available. Each suite may include various scripts. In this example, test suite entitled <MyTests> may include various scripts from Script 001 to Script xyz. In addition, each suite may include a Master Control Script (MCS).

The MCS may be customized for each suite, as shown by Master Control Script 520. Also, MCS may be in generic form where the same generic MCS may be used by multiple suites. In the generic MCS example, parameters may be passed to the Test Management Platform via the TARI application. The MCS identifies the scripts for testing, runs the scripts and then writes the results to a file, e.g., ARF.

Each suite may include an Importer Script. The Importer script may run using the corresponding ARF generated by the MCS. The Importer script also connects the Automation Platform to the Test Management Platform.

Master Control Script 520 illustrates the steps for identifying, running and writing results of test scripts. At step 520-1, the Master Control Script may load scripts from a particular test suite, e.g., <MyTests>. At step 520-2, certain scripts may be excluded. In this example, Script 002 and Script 004 are excluded from testing. At step 520-3, an Automated Results File (ARE) may be created. For example, the ARF may be a text file, e.g., <MasterScriptResults.txt>. At step 520-4, the ARF may be saved to an ARF Repository, as shown by 530. In this example, the ARF may be saved to a path called </Volumes/Results> within ARF Repository 530.

At step 520-5, the ARF may be open for writing results of test scripts within the identified test suite, e.g., <MyTests>. At step 520-6, when Script 001 is run, the result for this script may be identified. In this case, the result of Script 001 is successful. At step 520-7, the test result for Script 001 may be set to "passed." If a script was not successful at runtime, the test result may be set to "failed." In addition, an error result or other customized result may be set. At step 520-8, the results of the Script 001 may be written to a predetermined format. In this case, the format may include: Script identifier|results|testing tool|date|time|comment. For example, script identifier may be represented as "Script 001." Results may include "passed" and "failed." Other results may include "blocked," "inconclusive," "n/a," "no run, "not completed" or a customized result. Testing tool may identify the name of the third party testing software. Date and Time may represent date and time of execution. A comment field may indicate the identity of the tester, location, manual type, automated type and/or other customized metric. In this case, the format may yield "Script 001|passed|testing tool name|Sep. 23, 2011|11:00 am|automated by testing tool." At step 520-9, the process may continue for the next script identified in the test suite.

At step 520-10, Script 003 may run. At step 520-11, the test results may be set to "passed." At step 520-12, the results may be written to a predetermined format. In this case, the format may yield "Script 003|passed|testing tool name|Sep. 23, 2011|11:04 am|automated by testing tool." At step 520-13, the process will continue to the next test script.

At step 520-N, script xyz may run and the test result may be set for this script at step 520-N+1. At step 520-N+2, the results may be written to a predetermined format. In this case, the format may yield "Script xyz|passed|testing tool name|Sep. 23, 2011|11:07 am|automated by testing tool." At step 520-N+3, the ARF may be saved. At step 520-N+4, an Importer script may run using the saved ARF, in this case <MasterScriptResults.txt>.

Importer Script 540 illustrates the steps for automatically importing the ARF to the Test Management Platform Repository. At step 540-1, the Importer Script 540 may connect to a server, such as a Windows server through an IP address, user name, and password. At step 540-2, the TARI application may be launched. This may occur by double clicking a shortcut to the application or other mechanism for initiating the TARI application. At step 540-3, a login screen for accessing the TARI application may be displayed. The user may enter a user name and password combination. At step 540-4, a connection to a Test Management Platform may be established. A domain and project combination may be identified or selected.

At step 540-5, a target location may be identified. The user may select a folder from a list of available folder names. Also, a target location may be automatically identified. For example, within a domain and project combination, available folders may be displayed. A folder may be selected as a target location. For example, the folder "Automation" may contain the relevant test cases.

At step 540-6, a file for import may be identified. The Importer Script may navigate to a file or directory in the ARF Repository. In this example, the Importer Script may navigate to /Volumes/Results and select <MasterScriptResults.txt>. Also, an import file may be identified. At step 540-7, test results may be exported to the Test Management Platform. This may occur manually or automatically selecting a "Process Import File" icon. Through the use of an application program interface, e.g., Application Results Interface (ARI) 560, a connection to Test Management Platform Repository 550 may be established.

Test Management Repository 550 may include various domains, where each domain may include multiple projects and each project may include multiple test cases. Each test case may be associated with a test key parameter, which may also be associated with a corresponding test script. In this example, Test Case 001 stored in Test Management Repository 550 may include a test key parameter—001—which may in turn be associated with a test script, in this case, Script 001 in Automation Platform Repository. By using the test key parameter (e.g., 001), an embodiment of the present invention is able to associate a particular test case (e.g., Test Case 001) within the Test Management Platform to an appropriate test script (e.g., Script 001) at the Automation Platform. Thus, the results of Script 001 may be written to Test Case 001 at the TMP Repository 550. Accordingly, Test Case 001 within Project Alpha and Domain 1 corresponds to Script 001 in Suite <My Tests>.

An exemplary test case may correspond to a specific requirement for a device to be tested. For example, the requirement may include whether pushing button A will result in action X on a device to be tested. Script 001 may be developed to automate the testing of this test case. The result of Script 001, which may be "passed" if action X is achieved and "failed" if action X is not achieved, may be written to a file, e.g., ARF. The file may then be automatically exported to Test Case 001 at Test Management Platform. This particular test case is stored within Project Alpha, Domain 1. By using the test key parameter, in this case 001, the appropriate result of the corresponding script contained within the exported file, e.g., results of Script 001, may be associated with the corresponding test case, e.g., Test Case 001.

Figure 6:
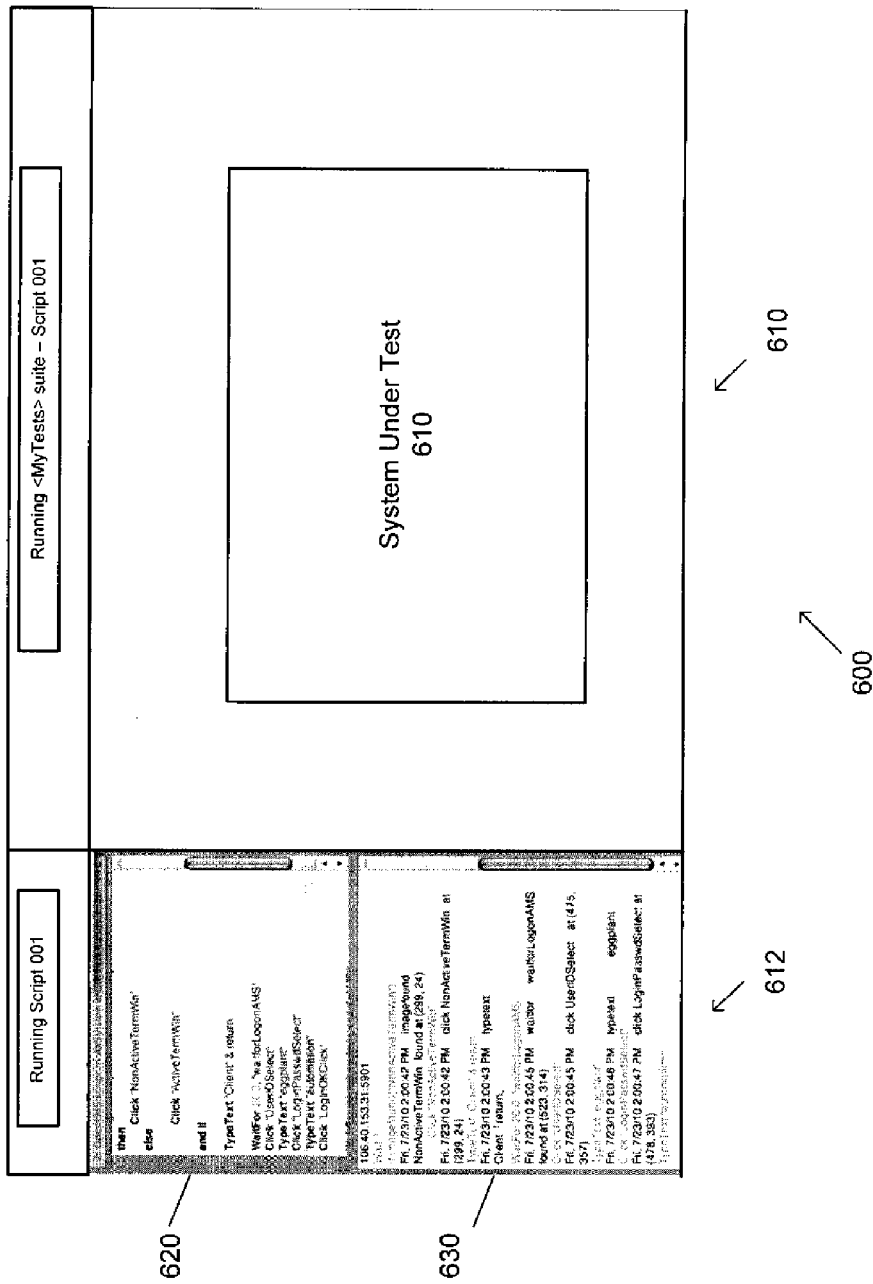
FIG. 6 illustrates an exemplary screen shot of an automation platform graphical user interface according to a particular embodiment.

FIG. 6 illustrates an exemplary screen shot of an Automation Platform graphical user interface 600 according to a particular embodiment. Automation Platform represented by window 612 may connect to a System Under Test (SUT) represented by window 610 via a virtual network connection or other type of connection. As shown in window 610, a system or device may be tested by a testing tool running on the automation platform. A Master Control Suite may call individual scripts that run against a SUT until all identified scripts in a test suite have been executed. In this example, Script 001 from Suite <MyTests> is running. As shown by window 620, the details of Script 001 may be illustrated in step by step format. As shown by window 630, the results of each step of Script 001 may be shown. For example, the current step may be highlighted in window 620 and a current result of that step may also be highlighted in window 630.

Figure 7:
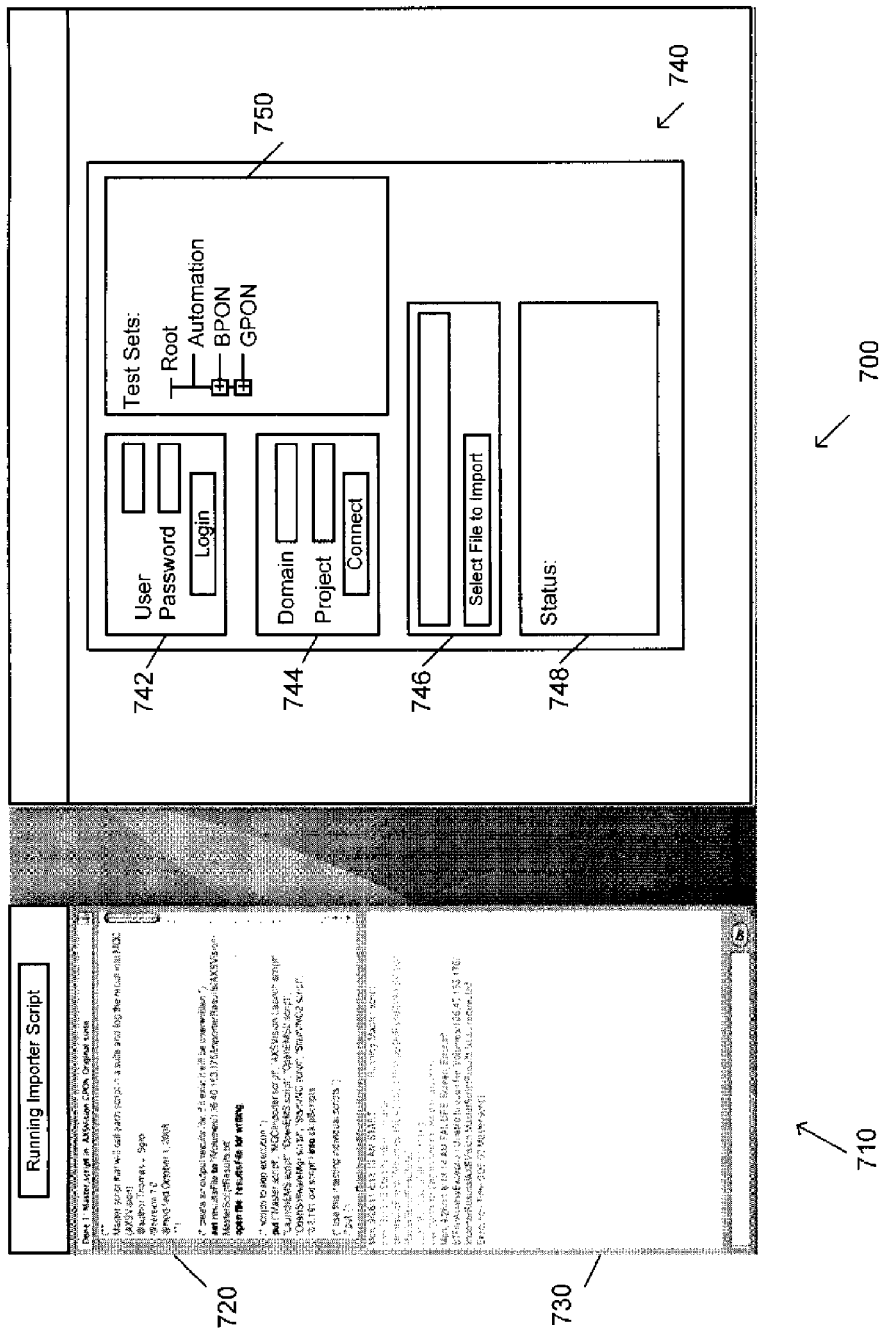
FIG. 7 illustrates an exemplary screen shot of an automation platform graphical user interface as it connects to a test automation results importer application according to a particular embodiment.

FIG. 7 illustrates an exemplary screen shot of an Automation Platform graphical user interface 700 as it connects to a Test Automation Results Importer application according to a particular embodiment. As shown in panel 710, Master Control Script calls an Importer Script which initializes and runs the TARI application. For example, window 720 shows details of the Master Control Script as it runs the Importer Script on a step by step basis. Window 730 shows the results of each step as it runs. Window 740 illustrates a server with the TARI application installed. Window 740 is similar to FIG. 4. A user is able to login to the TARI application by inputting a user and password combination at 742. A domain and project may be identified at 744. This may be automatically identified or a user may manually select the domain and project combination. An import file, e.g., ARF, may be identified at 746. This may be automatically identified or a user may manually select the file for import. As the program is being implemented, status information may be displayed at 748. For example, when a user selects an import file to import, the status window may verify the file selected. When results of the selected import file are being exported, the status may provide a running status for each import. The status may also verify when the writing process has been completed. Also, when the results of a script do not match to a test case, an error message may be displayed along with details of the script, test case and test key parameters.

Test Sets hierarchy may be displayed at 750. For example, the hierarchy may illustrate the various folders stored in Test Management Platform Repository. In this example, Test Sets 750 displays a collection of test cases available in the domain and project combination identified at 744. For example, an "Automation" folder shown in 750 may contain the various test cases. In accordance with this example, the system provides a central location in the "Automation" folder for test cases. Thus, the system may automatically access the "Automation" folder to identify test key parameters, e.g., 001, to match test cases, e.g., test case 001, to test scripts, e.g., Script 001. In addition, multiple folders may be used to store test cases by predetermined categories or other logical groupings.

Figure 8:
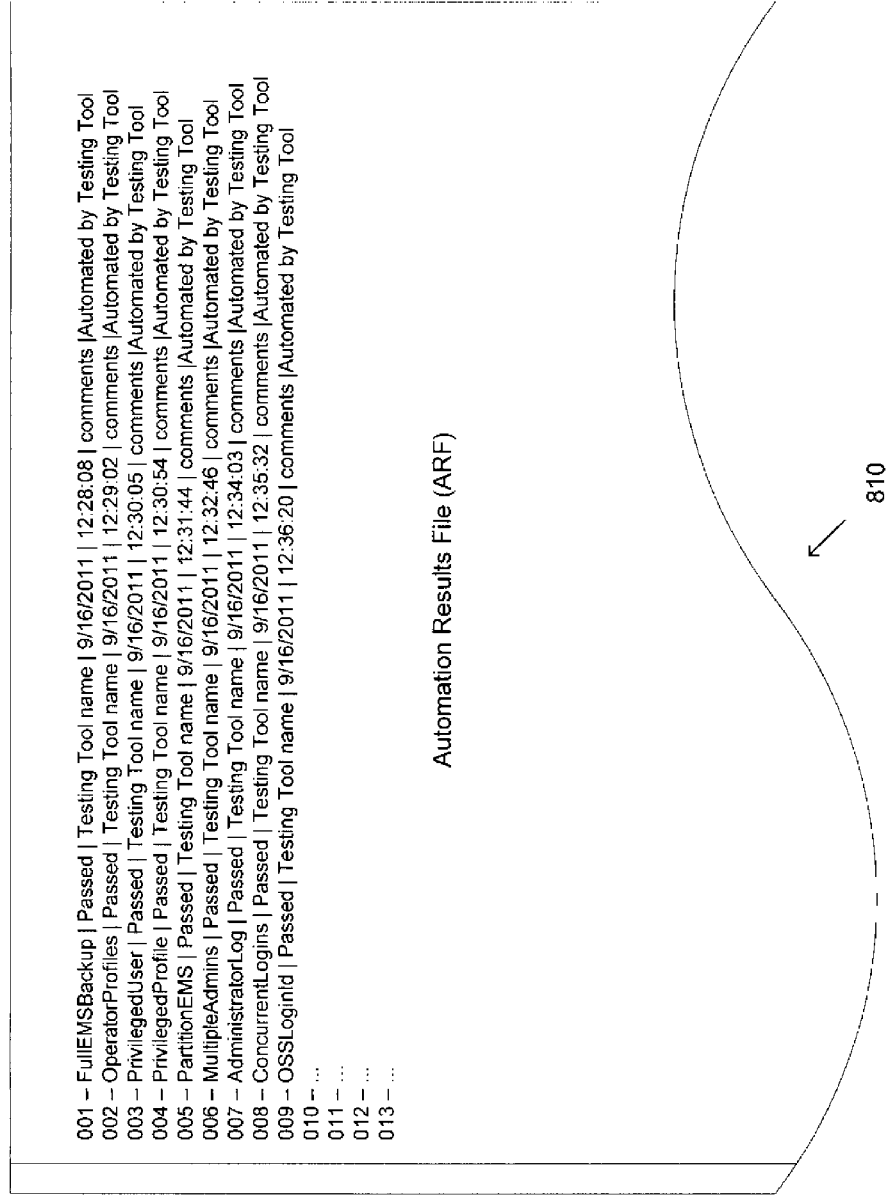
FIG. 8 is a detailed illustration of an automation results file according to a particular embodiment.

FIG. 8 is a detailed illustration of an Automation Results File 810 according to a particular embodiment. The ARF may be stored at an ARF Repository which may be associated with an Automation Platform. While an association with Automation Platform is shown, the ARF Repository may be separate and/or associated with other platforms or systems. As shown in FIG. 8, the ARF may use a predetermined format. In this case, the format may include: testscript identifier|passed/failed status|Testing Tool name|date|time|comments|automated by Testing Tool. Other formats may be customized and implemented.

Testscript identifier may include a test key parameter and a description of the test case. For example, a test script identifier may be "001—FullEMSBackup" where "001" represents a test key parameter and "FullEMSBackup" represents a brief description of a function being tested. Additional information may include test results, which may include "Passed" or "Failed." A Testing Tool name may identify the name of the third party testing software or other program used in the Automation Platform. A date and time field may represent when the test script was executed. A comments field may provide additional information related to the test case or test script. The comments field may also indicate whether the test was automated, manual or other type.

Figure 9:
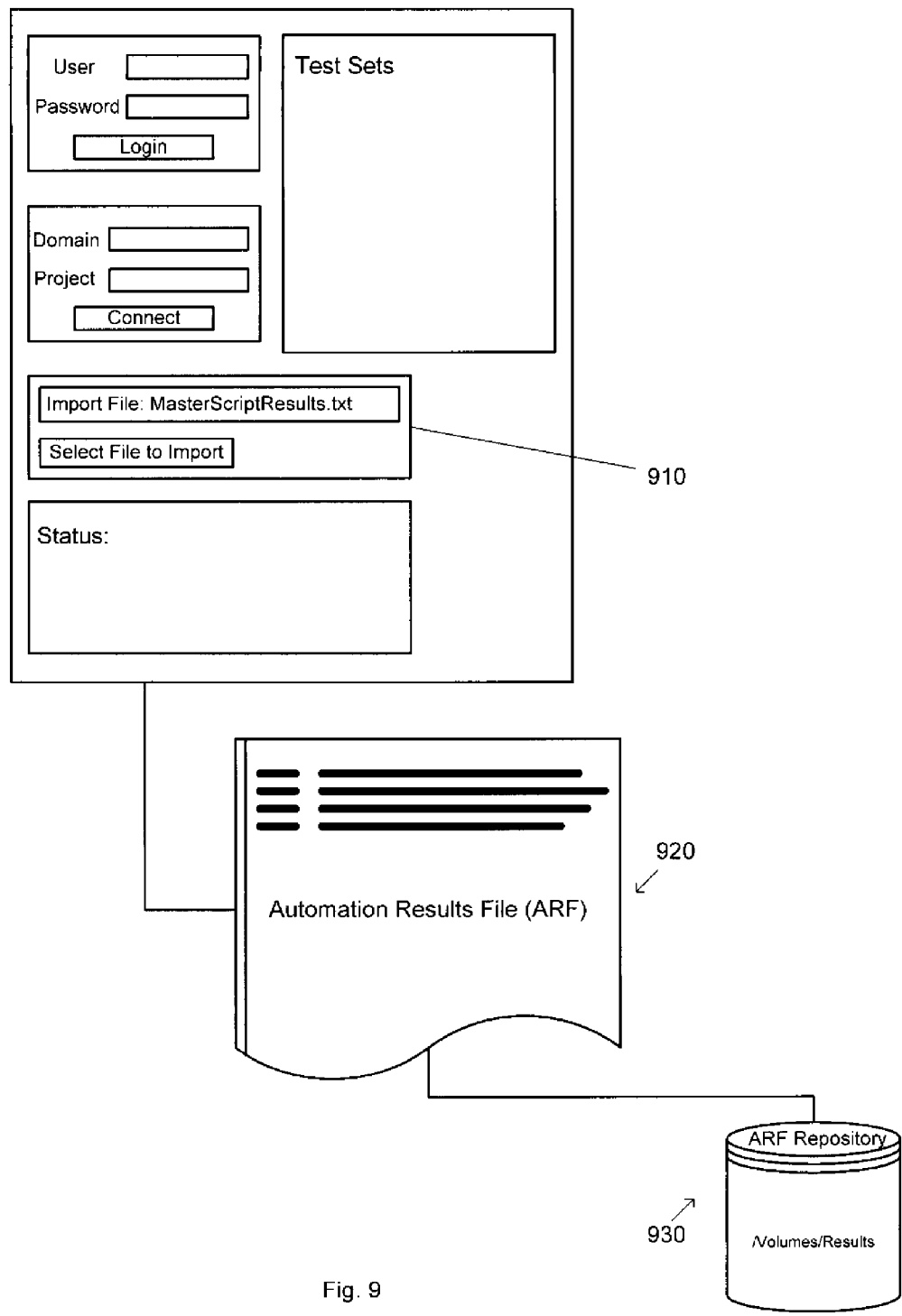
FIG. 9 is an exemplary illustration of an import file selection process according to a particular embodiment.

FIG. 9 is an exemplary illustration of an import file selection process according to a particular embodiment. An import file may be automatically selected or manually identified by the user. As shown in Window 910, MasterScriptResults.txt file may be identified. This file may be accessed from ARF Repository 930 in directory path/Volumes/Results. The ARF file is shown by 920.

Figure 10:
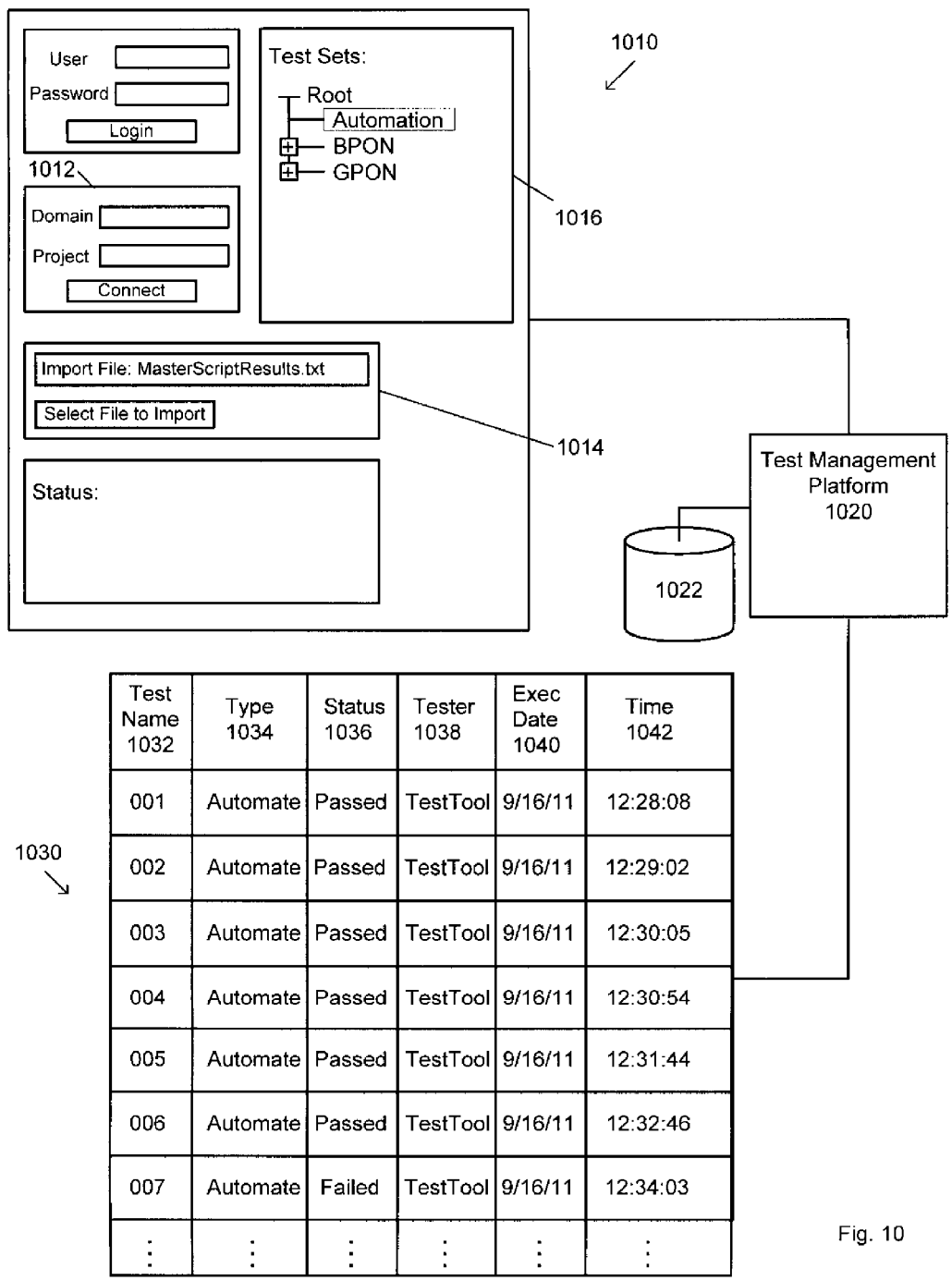
FIG. 10 is an exemplary illustration of an import file process according to a particular embodiment.

FIG. 10 is an exemplary illustration of an import file process according to a particular embodiment. As shown by 1010, at the TARI application graphical user interface, a user or an Importer Script may initiate an import file process. By doing so, the TARI application processes the identified file, e.g., Automated Results File, and stores the results data to a target location at Test Management Platform 1020. As show in 1014, the import file is identified as MasterScriptResults.txt. Test Sets 1016 provides a graphical illustration of the folders associated with the identified domain and project combination, shown in 1012. As shown in 1016, the folder "Automation" is selected. Within the "Automation" folder are the relevant test cases.

Window 1030 illustrates an exemplary graphical user interface from Test Management Platform. The relevant test cases are stored in "Automation" folder in the identified Project and Domain. Window 1030 illustrates how the data from ARF may be stored in Test Management Platform 1020 and its associated Repository 1022. The results of Script 001 may be stored in Test Case 001, which in this example is referred to as Test Name 001. As shown here, Type 1034, Status 1036, Tester 1038, Execution Date 1040 and Time 1042 are written from the results of the ARF for each corresponding test case identified by a corresponding test key parameter. For example, test name 1032 may display a test case identifier, type 1034 may be shown as "Automate," and status 1036 for each test case may be displayed as "passed" or "failed." Color schemes and graphics may be used to further simplify the display. Responsible Tester 1038 may display the name of the testing tool and/or actual tester name. Executed Date 1040 and Time 1042 may be displayed as well. Other fields, such as Comments and other information, may also be displayed.

Confirmation of the results information as it is written into Test Management Platform may be displayed. For example, by selecting a particular test case, additional details may be displayed, which may include information from the Comments field of a test case.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

For illustration purposes, an exemplary section of code is provided below. This section illustrates the import file process. Specifically, the code illustrates identifying and reading an Automated Results file and writing the results of each test script to a target location, e.g., test set folder, in the Test Management Platform. When the import file process is complete, the status box is updated to reflect the completion of the import.

```
' Read Import File
stopWatch.Start ( )
Using sr As New IO.StreamReader (txt_FileSelected.Text)
Dim line As String
line = sr.ReadLine
While line < > Nothing
Application.DoEvents ( )
importCount = importCount + 1
' split the input line, it should contain "0 Test Name | 1 Result | 2
Tag | 3 Date | 4 Time | 5 Tester | 6 Comment"
Dim split As String ( ) = line.Split (New [Char] ( ) {"|"})
' check for all fields
If split.Length < > 7 Then
txt_StatusTextBox.AppendText ("Error: '" & line & "' does not
contain all the expected fields,. . . skipping." & vbCrLf)
line = sr.ReadLine
C:\Users\Thomas Sgro\Documents\. . .\MQC Test Results Importer\fr_Main.vb 4
Continue While
End If
' Display entry in status window
txt_StatusTextBox.AppendText ("Processing: " & line & vbCrLf)
' does the result string exist in the list possible results if not
mark as inconclusive
If (Not possibleResults.Contains(split(1).ToLower) ) Then
txt_StatusTextBox.AppendText ("Error: '" & split(1) & "' is not an
expected result value. Setting result to Inconcluive." & vbCrLf)
split(1) = "Inconclusive"
End If
' Get the test set folder
tSetFolder = tsTreeMgr.NodeByPath(tv_testset.SelectedNode.FullPath)
TestSetsList = tSetFolder.FindTestSets("Automated Scripts")
theTestSet = TestSetList.Item(1)
' Get the TSTest factory and list of TSTests
TestFilter.Filter("TS_NAME") = split(0)
TSTestFact = theTestSet.TSTestFactory
TestSetTestsList = TSTestFact.NewList (TestFilter.Text)
' Check if test found
If (TestSetTestsList.Count = 0) Then
txt_StatusTextBox.AppendText ("Error: '" & split(0) & "' was not
found in this project/test set,. . .skipping." & vbCrLf)
line = sr.ReadLine
Continue While
End If
' insert a new run and step result set
Dim runName$
For Each theTSTest In TestSetTestsList
Application.DoEvents ( )
' create run instance
runName = DateString & "-" & TimeString & "-" & split (2)
```

-continued

```
RunF = theTSTest.RunFactory
theRun = RunF.AddItem(runName)
theRun.Status = split(1)
'theRun.Field("RN_EXECUTION_DATE") = split(3)
'theRun.Field("RN_EXECUTION_TIME") = split(4)
'theRun.Field("RN_TESTER_NAME") = "tsgro"
theRun.Post ( )
'Get the design step created above for the test to be associated
with this test run
theRun.CopyDesignSteps ( )
theRun.Post ( )
' markup steps for run instance
runStepF = theRun.StepFactory
1st = runStepF.NewList (" ")
For Each Item In 1st
Application.DoEvents ( )
runStep = Item
C:\Users\Thomas Sgro\Documents\...\MQC Test Results Importer\fr_Main.vb 5
runStep.Status = split(1)
'runStep.Field("ST_EXECUTION_DATE") = split(3)
'runStep.Field("ST_EXECUTION_TIME") = split(4)
commentStr = "Run Date/time: " & split(3) & "-" & split(4) &
vbCrLf & _
"Tested by: " & split(5) & vbCrLf & vbCrLf & _
"Comments:" & vbCrLf & _
"- - - - - - - - - - - - - -" & vbCrLf & _
split(6)
runStep.Field("ST_ACTUAL") = commentStr
runStep.Post ( )
Next
Next theTSTest
' read next line
line = sr.ReadLine
End While
'close open file
sr.Close ( )
End Using
' Indicate that we have finished the test import
txt_StatusTextBox.AppendText (vbCrLf & "- - - -Finished- - - -" & vbCrLf)
elapsedMilliSecs = stopWatch.ElapsedMilliseconds
stopWatch.Stop ( )
recSecs = Math.Round ( ( (elapsedMilliSecs / 1000) / importCount), 2)
txt_StatusTextBox.AppendText(vbCrLf & "Total elapsed seconds:" & vbTab &
(elapsedMilliSecs / 1000) & vbTab & vbTab & "seconds" & vbCrLf)
txt_StatusTextBox.AppendText ("Total number of imports:" & vbTab & importCount
& vbTab & vbTab & "records" & vbCrLf)
txt_StatusTextBox.AppendText("Average time per record:" & vbTab & recSecs &
vbTab & vbTab & "sec/rec")
Exit sub
```

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

What is claimed is:

1. A method, comprising:
   creating a master control script by loading a plurality of test scripts from a test suite;
   creating an automated results file, wherein the automated results file comprises a predetermined format;
   running each test script in the master control script to generate a result;
   writing each result of each test script in the master control script to the automated results file;
   saving the automated results file in an automated results file repository;
   running an importer script using the automated results file;
   connecting to a test management platform through the importer script;
   identifying a target location in the test management platform, wherein the target location comprises a plurality of test cases;
   identifying the automated results file stored in the automated results file repository;
   automatically exporting the automated results file to the target location of the test management platform, wherein the results of each test script in the automated results file is written to each test case in the target location using a corresponding test key parameter; and
   displaying status information indicating a total number of test case imports, a time of test case imports, and an average time of each test case import.

2. The method of claim 1, wherein the automated results file comprises a format that comprises a test script identifier, test result, testing tool and date and time of testing.

3. The method of claim 1, wherein the step of creating a master control script further comprises identifying one or more test scripts for exclusion.

4. The method of claim 1, wherein the target location is associated with a domain and a project, wherein the domain comprises a plurality of different projects.

5. The method of claim 1, wherein the master control script is specific for each test suite.

6. The method of claim 1, wherein the master control script is generic for a plurality of test suites.

7. The method of claim 1, wherein the importer script is generic for a plurality of test suites.

8. The method of claim 1, wherein the plurality of test cases are stored in a centralized location.

9. A non-transitory computer readable media comprising code to perform the acts of the method of claim 1.

10. A system, comprising:
   at least one computing device, wherein the at least one computing device is configured to:
      create a master control script by loading a plurality of test scripts from a test suite;
      create an automated results file, wherein the automated results file comprises a predetermined format;
      run each test script in the master control script to generate a result;
      write each result of each test script in the master control script to the automated results file;
      save the automated results file in an automated results file repository; and
      run an importer script using the automated results file; and
   an importer interface processor configured to:
      connect to a test management platform through the importer script;
      identify a target location in the test management platform, wherein the target location comprises a plurality of test cases;
      identify the automated results file stored in the automated results file repository;
      automatically export the automated results file to the target location of the test management platform, wherein the results of each test script in the automated results file is written to each test case in the target location using a corresponding test key parameter; and
      display status information indicating a total number of test case imports, a time of test case imports, and an average time of each test case import.

11. The system of claim 10, wherein the automated results file comprises a format that comprises a test script identifier, test result, testing tool and date and time of testing.

12. The system of claim 10, wherein the automation platform is configured to identify one or more test scripts for exclusion.

13. The system of claim 10, wherein the target location is associated with a domain and a project, wherein the domain comprises a plurality of different projects.

14. The system of claim 10, wherein the master control script is specific for each test suite.

15. The system of claim 10, wherein the master control script is generic for a plurality of test suites.

16. The system of claim 10, wherein the importer script is generic for a plurality of test suites.

17. The system of claim 10, wherein the plurality of test cases are stored in a centralized location.

\* \* \* \* \*